(12) United States Patent
Schneider et al.

(10) Patent No.: US 10,193,816 B2
(45) Date of Patent: Jan. 29, 2019

(54) METHOD FOR OPERATING AN INFORMATION-CENTRIC NETWORK AND NETWORK

(71) Applicant: NEC EUROPE LTD., Heidelberg (DE)

(72) Inventors: Fabian Schneider, Heidelberg-Bahnstadt (DE); Dirk Kutscher, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 302 days.

(21) Appl. No.: 14/917,579

(22) PCT Filed: Sep. 12, 2013

(86) PCT No.: PCT/EP2013/068919
§ 371 (c)(1),
(2) Date: Mar. 9, 2016

(87) PCT Pub. No.: WO2015/036023
PCT Pub. Date: Mar. 19, 2015

(65) Prior Publication Data
US 2016/0226782 A1 Aug. 4, 2016

(51) Int. Cl.
*H04L 29/08* (2006.01)
*H04L 12/24* (2006.01)
*H04L 12/841* (2013.01)
*H04L 29/12* (2006.01)

(52) U.S. Cl.
CPC .......... *H04L 47/28* (2013.01); *H04L 41/0896* (2013.01); *H04L 41/12* (2013.01); *H04L 67/06* (2013.01); *H04L 67/2833* (2013.01); *H04L 61/1582* (2013.01)

(58) Field of Classification Search
None
See application file for complete search history.

(56) References Cited

U.S. PATENT DOCUMENTS

| | | | |
|---|---|---|---|
| 7,809,848 B1 | 10/2010 | McDougall et al. | |
| 8,504,718 B2* | 8/2013 | Wang | H04L 45/306 709/238 |
| 8,516,146 B1 | 8/2013 | Yen | |
| 9,819,643 B2* | 11/2017 | Rangarajan | H04L 61/302 |
| 2012/0131144 A1 | 5/2012 | Cooper et al. | |
| 2012/0263186 A1* | 10/2012 | Ueno | H04L 45/306 370/401 |

(Continued)

OTHER PUBLICATIONS

Bengt Ahlgren, et al., "A Survey of Information-Centric Networking", IEEE Communications Magazine, Jul. 2012, pp. 26-36.

(Continued)

*Primary Examiner* — Patrice L Winder
(74) *Attorney, Agent, or Firm* — Leydig, Voit & Mayer, Ltd.

(57) ABSTRACT

A method for operating an information-centric network (ICN), wherein at least one named data object (NDO) is addressable, and wherein after an initial request, a request aggregation of subsequent requests for the at least one NDO is performed according to a definable rule. The method includes implementing software-defined networking (SDN) in the ICN with an SDN controller, and performing a network-wide request aggregation by the SDN controller.

31 Claims, 3 Drawing Sheets

(56) References Cited

U.S. PATENT DOCUMENTS

| | | | |
|---|---|---|---|
| 2013/0227166 A1* | 8/2013 | Ravindran | H04L 67/327 709/238 |
| 2013/0242804 A1* | 9/2013 | Yabusaki | H04L 41/0893 370/255 |
| 2013/0315580 A1* | 11/2013 | Boertjes | H04J 14/0204 398/5 |
| 2013/0332619 A1* | 12/2013 | Xie | H04L 67/2823 709/230 |
| 2013/0343229 A1* | 12/2013 | Gasparakis | H04L 45/66 370/256 |
| 2014/0164584 A1* | 6/2014 | Joe | H04L 12/5689 709/223 |
| 2014/0369348 A1* | 12/2014 | Zhang | H04L 45/121 370/389 |
| 2015/0009830 A1* | 1/2015 | Bisht | H04L 47/125 370/236 |
| 2015/0012484 A1* | 1/2015 | Jindal | G06F 17/30289 707/609 |
| 2015/0372911 A1* | 12/2015 | Yabusaki | H04L 67/34 709/226 |

OTHER PUBLICATIONS

Nick McKeown, et al., "OpenFlow: Enabling Innovation in Campus Networks", ACM SIGCOMM Computer Communication Review, vol. 38, No. 2, Apr. 2008, pp. 69-74.

* cited by examiner

METHOD FOR OPERATING AN INFORMATION-CENTRIC NETWORK AND NETWORK

CROSS REFERENCE TO RELATED APPLICATIONS

This application is a U.S. National Stage Application under 35 U.S.C. § 371 of International Application No. PCT/EP2013/068919 filed on Sep. 12, 2013. The International Application was published in English on Mar. 19, 2015 as WO 2015/036023 A1 under PCT Article 21(2).

FIELD

The present invention relates to a method for operating an information-centric network (ICN), wherein at least one named data object (NDO) is addressable. Furthermore, the present invention relates to an information-centric network (ICN) comprising at least one addressable named data object (NDO).

BACKGROUND

In an information-centric network (ICN), communication is not based on packets that are "sent from" and "destined to" hosts or host interface addresses. In ICN, requestors send requests to the network, asking for named data objects (NDOs) that have been published before and that are available in one or many copies in the network. The network elements, e.g. switches or nodes, that receive a request—unless they have a local copy in their cache—typically have to decide where to forward the request to, for example which interface to use for forwarding the request. Typically a network switch or network node can participate in a routing protocol that helps to distribute this information, or a network switch or network node can employ a Name Resolution Service (NRS) that can map NDOs to locators in underlying networks, for example an IP network.

Once a request has been forwarded and reached the destination, e.g., a NDO copy in a cache, a corresponding response message, i.e., the NDO or a locator, has to be relayed back to the requestor, possibly passing one or more on-path caches that can cache the objects in order to satisfy future requests from their cache. This return path can be determined in different ways: For example network elements can maintain state or they can obtain some information from data structure inside messages, such as a label stack.

A survey of information-centric networking is obtainable from Ahlgren, B.; Dannewitz, C.; Imbrenda, C.; Kutscher, D.; Ohlman, B., "A survey of information-centric networking," *Communications Magazine, IEEE*, vol. 50, no. 7, pp. 26,36, July 2012, doi: 10.1109/MCOM.2012.6231276, URL: http://ieeexplore.ieee.org/xpl/articleDetails.jsp?arnumber=6231276

The basic idea of software-defined networking (SDN) is to separate network control-plane logic from data-plane forwarding. This means breaking today's feature-rich network elements, e.g. switches, nodes or routers, into dumb forwarding elements and complex network controllers. SDN relies on the concept of providing an application programming interface (API) or protocol for packet forwarding devices such as switches, nodes and routers, which allows programmability of network elements and entire networks. An example for such a controller to switch protocol is OpenFlow, see OpenFlow Switch Specification, Version 1.0.0 (Wire Protocol 0x01), Dec. 31, 2009. http://www.openflow.org/documents/openflow-spec-v1.0.0.pdf.

Information-centric networking approaches, such as Content Centric Networking (CCN), or Network of Information (NetInf), follow the basic principle of addressing content objects, NDOs, and not hosts or end-points. One often mentioned advantage in ICN is "request aggregation". Request aggregation is the concept to avoid forwarding subsequent requests for the same NDO arriving at the same ICN node or switch, so that the request and the NDO are transmitted only once over the path between that node or switch and the content source. For reference, see also FIG. 1 which is showing a per-node request aggregation. Concretely, FIG. 1 is showing three different points in time, where requests R1, R2 and R3 are performed from different requestors. There is requested a content A which is provided within a source S. The content A shall be transmitted to hosts H1, H2 and H3 according to the indications by arrows within FIG. 1, right part. Nodes N1 to N6 are provided within the shown ICN structure. The left part of FIG. 1 is showing the request R1 for the content A. This request R1 is transmitted from N1 to N6 and the source S as shown within the left and middle parts of FIG. 1. Within this middle part of FIG. 1 a further request R3 is directed to N1 and is aggregated and delayed by node N1. A further request R2 directed to node N2 will be transmitted to N6 and the source S. As obtainable from the right part of FIG. 1 the content A is transmitted two times on two ways from S to N1 and from S to N2 for provision to hosts H1, H2 and H3.

For request aggregation in ICN, a node or switch delays the forwarding of subsequent requests for the same NDO, as the responses to the first request are expected to pass by and will then serve both or all requests. Per-node request aggregation is well known for ICN.

SUMMARY

In an embodiment, the present invention provides a method for operating an information-centric network (ICN), wherein at least one named data object (NDO) is addressable, and wherein after an initial request, a request aggregation of subsequent requests for the at least one NDO is performed according to a definable rule. The method includes implementing, in the ICN, software-defined networking (SDN) with an SDN controller, and performing a network-wide request aggregation by the SDN controller.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
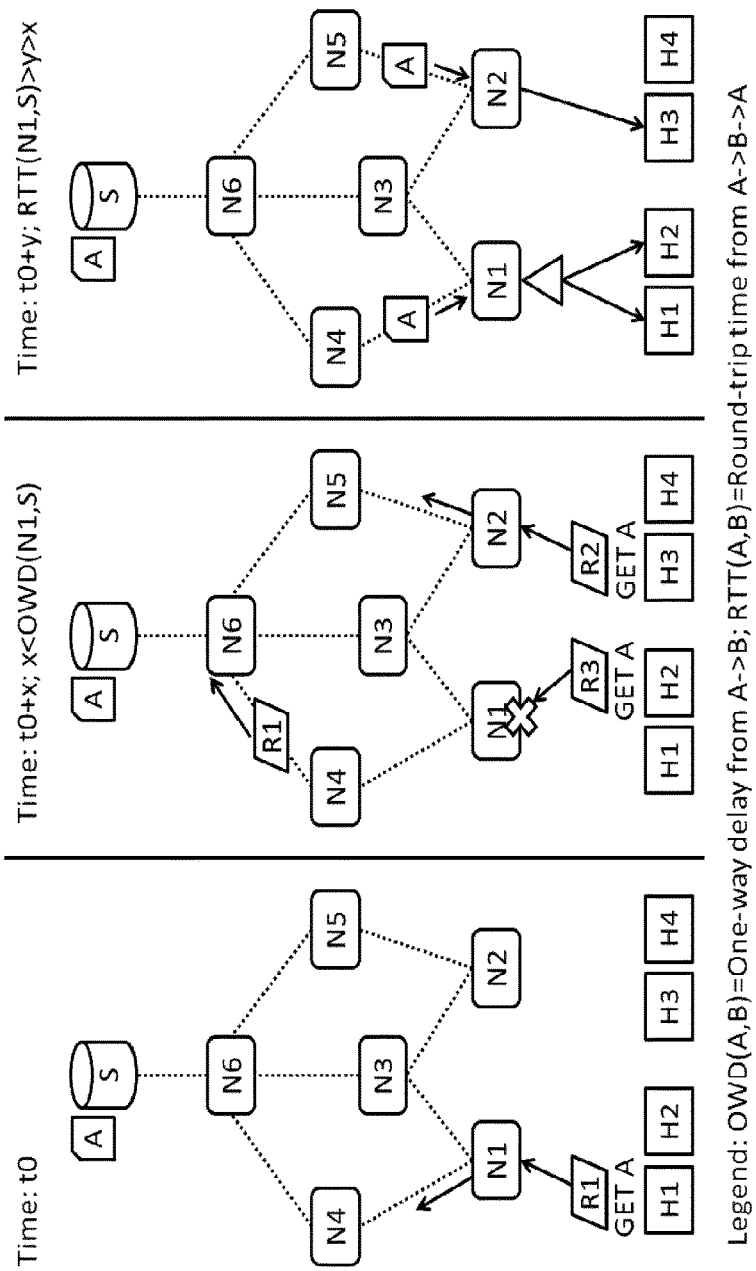
FIG. 1 depicts, in a diagram, three subsequent situations of a per-node request aggregation within known information-centric networks.

Even though known request aggregation mechanisms are helpful for reducing the scope of transmitted ICN messages, like request and response messages, a further enhancement of the effectiveness of use of network resources could be useful in view of generally increasing traffic within data networks. Therefore, embodiments of the present invention provide a method for operating an information-centric network and provide an information-centric network for allowing a very effective use of network resources by simple means.

According to an embodiment of the invention, a method is characterized in that software-defined networking (SDN,) with an SDN controller, is implemented in the ICN and that a network-wide request aggregation is performed by the SDN controller.

According to an embodiment of the invention, a network is characterized in that software-defined networking (SDN) with an SDN controller, is implemented in the ICN and in that the SDN controller is configured for performing a network-wide request aggregation.

According to an embodiment of the invention, it is possible to enable a very effective use of network resources by further reducing transmitted ICN messages. Such a further reduction of transmitted ICN messages can be provided by an enhancement of the network control by the implementation of software-defined networking (SDN) with an SDN controller. Further according to an embodiment of the invention, the SDN controller performs a network-wide request aggregation instead of the known per-node request aggregation within known information-centric networks. The invention is especially beneficial for live streaming of data to multiple receivers or hosts, as many requests for the same NDO arrive at the same time at different nodes or switches of the network. This invention provides a network-wide version of request aggregation made possible through ICN control.

On the basis of an embodiment of the invention, a very effective use of network resources is possible. Within a concrete embodiment, a centralized SDN controller is used for providing request aggregation mechanisms. For providing a very effective request aggregation, the SDN controller can detect duplicate requests.

Depending on a definable rule, the SDN controller can decide on which requests to delay. Such a decision can be performed centrally. Further depending on the definable rule the SDN controller can decide how to route and/or where to duplicate the at least one NDO. The NDO can be seen as a response to a respective request.

With regard to a very reliable operation of the request aggregation mechanism the ICN can operate in a mode wherein a request path and a response path are provided at the same time upon an initial handling of the initial request. However, a similar but simpler approach is possible, wherein the ICN operates in a mode wherein a response path is only provided when a NDO response or a transmission of the NDO or a transmission of the content of the NDO is generated.

Regarding a very effective use of the network resources a best content source for the at least one NDO can be determined. In this way a best content source is selected between multiple content sources all providing the same at least one NDO. Such a determination of a best content source can be performed under the knowledge where content of the NDO or the NDO itself is cached. Thus, the determination of a best content source can be cache-aware, i.e. can know where content is cached.

Within this description the term "content source" or "source" is used for an ICN switch or node or router actually providing the desired NDO form its storage as well as for an ICN node or switch or router at the egress of the ICN, wherein said ICN node or switch or router knows how to retrieve the content from another ICN node or switch or router. The ICN elements "node" or "switch" or "router" are used herein synonymously.

A concrete embodiment of an SDN controller for network-wide request aggregation can comprise a Pending-Request Table (PRT). Such a PRT can also be designated as pending interest table.

Regarding a very reliable operation of the request aggregation method according to an embodiment, entries in the PRT should comprise different information. Thus, the PRT can comprise a name or identification of the requested NDO and/or a counter differentiating between requests for the same name or identification and/or an identifier of an ingress SDN switch/node and/or a selected content source for the NDO and/or a selected return path for the NDO and/or the estimated time of arrival of the requests at the content source. Further, the SDN controller can comprise the topology of the ICN with regard to an optimization of the routing of NDOs, for example.

Within a further embodiment the SDN controller can comprise an expected per link one-way delay information. This will provide a very sophisticated routing and scheduling of requests and NDOs.

Within a further embodiment the SDN controller can comprise a cost metric for all possible paths and/or content sources. Such a cost metric can serve as input to a spanning tree calculation and can be related to a link delay and/or a link bandwidth and/or a link utilization and/or a content source utilization. A relation to other traffic engineering metrics is also useful and/or possible.

Generally, with regard to a reliable and effective request aggregation mechanism the SDN controller can comprise the definable rule. Within a concrete request aggregation method according to an embodiment, the SDN controller can determine the best available content source $S^{X,i}$ for serving the requested NDO X, wherein i denotes the i'th request seen by the SDN controller and wherein the current time is set to $t^0$. Further, using $I^{X,i}$, an ingress switch/node of the ICN, and $S^{X,i}$, the SDN controller can calculate a path for the request $RP^{X,i}:I^{X,i} \rightarrow S^{X,i}$ and a path for returning the NDO $P^{X,i}:S^{X,i} \rightarrow I^{X,i}$. Then, the SDN controller can determine all other pending request j for the same NDO X, whose request has not yet reached the content source, $ETA^{X,j} > t^0$, and can add them to a list of candidate requests C for aggregation.

If the list of candidate requests C is empty, the request will not be aggregated and the SDN controller can configure $RP^{X,i}$ and $P^{X,i}$ and estimate the estimated time of arrival $ETA^{X,i}$ for that request at the content source. If the list of candidate requests C is not empty, the SDN controller can check whether aggregation of requests is possible. Then, the SDN controller can calculate one or more multiple spanning trees (MST) from a set of all possible content sources ($\{S^{X,j}$ in $C\} \cup S^{X,i}$) to a set of all ingress switches/nodes ($\{I^{X,j}$ in $C\} \cup I^{X,i}$).

Then, the SDN controller can evaluate the resulting MSTs regarding their cost. If the lowest cost MST that includes the ingress switch/node $I^{X,i}$ is equivalent to $P^{X,i}$, then no aggregation will be performed. If there is an MST with lower cost, the SDN controller can instruct the ingress switch/node $I^{X,i}$ to drop the request and update $S^{X,i}$ and all other affected $P^{X,j}$ and can configure a new path in the ICN.

The MST can define duplication points in the ICN. Additionally or alternatively, the SDN controller can configure copy rules in the switches/nodes within the ICN. Then, the SDN controller can set the ETA for the current request to the minimum of ETA of the other requests in the selected MST ({$ETA^{X,j}$ in MST}).

Within a very simple version of the request aggregation mechanism, a feedback can notify the SDN controller when the at least one NDO is sent from its content source. In this case, there is no longer a need for delay annotations in the topology and the ETA estimation.

Within a further preferred embodiment, once the at least one NDO has been delivered to the requestor, an entry in the PRT can be removed. This will avoid the storage of data which are no longer necessary for further request aggregation.

An embodiment of the present invention provides a mechanism for network-wide request aggregation for ICN leveraging knowledge and control mechanisms of a preferably centralized controller. Main applications for this approach are streaming services or live streaming services, due to the timely synchronized number of requests for the same NDO. The invention can provide a cost-aware optimization of request/response routing and a request/response-timing-aware path-selection. Further, per-request aggregation decisions are possible.

An embodiment of the present invention provides a further reduction of transmitted ICN messages, e.g. request and response messages, and a real-time, network-state-aware delivery tree optimization for NDOs.

In current ICNs request aggregation is done on a per-node basis. An embodiment of the present invention provides a network-wide approach to realize additional optimization potential. An embodiment of the present invention is useful with ICNs that are deployed with a preferably centralized control approach, that allows to individually steer, drop and copy ICN requests and NDO responses.

According to an embodiment of the invention, a method for operating an information-centric network (ICN) is provided wherein at least one named data object (NDO) is addressable and wherein after an initial request a request aggregation of subsequent requests for the at least one NDO is performed according to a definable rule. Further, software-defined networking (SDN) with an SDN controller is implemented in the ICN and a network-wide request aggregation is performed by the SDN controller.

Figure 2:
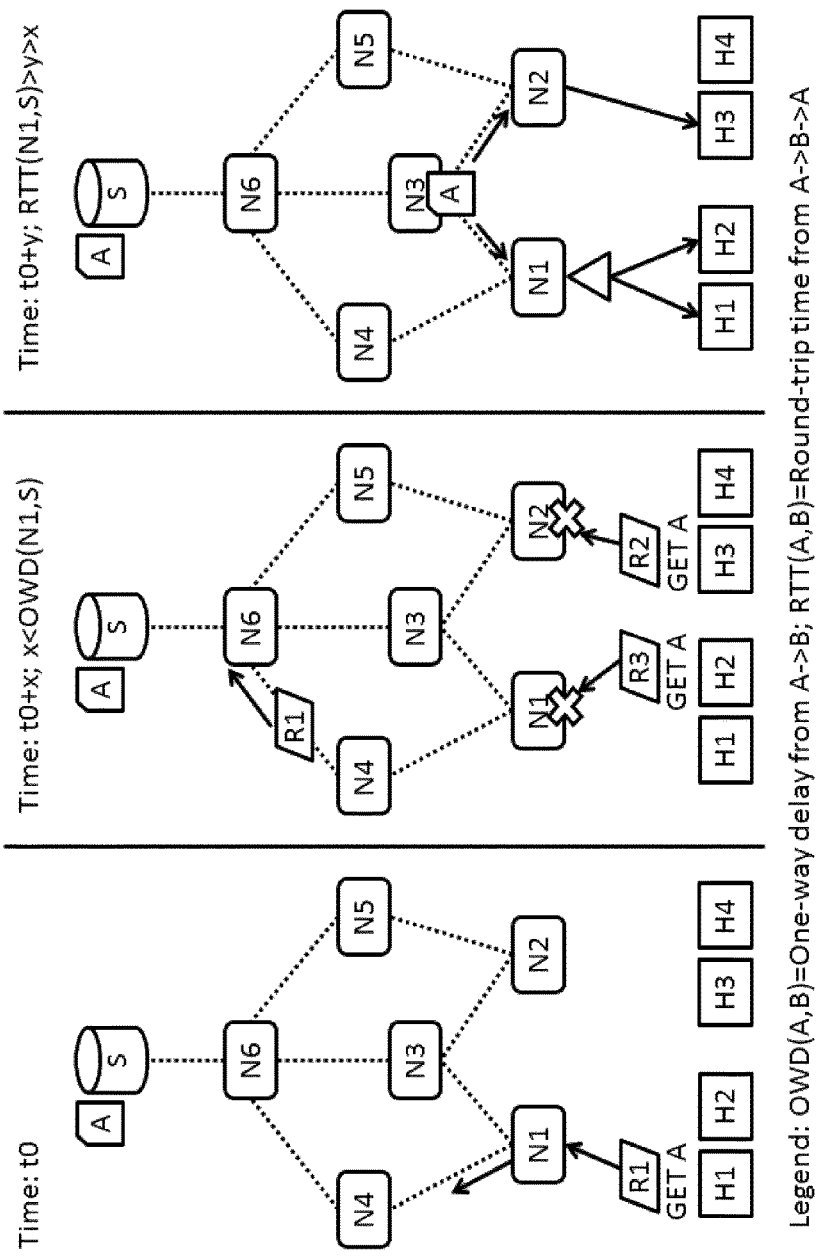
FIG. 2 depicts, in a diagram, three subsequent situations of a network-wide request aggregation according to an embodiment of the invention.

The embodiment comprises a network-wide version of request aggregation, made possible through a preferably centralized ICN control by the SDN controller. The detection of duplicate requests will be performed by the SDN controller and the SDN controller can decide centrally on which requests to delay and how to route and where to duplicate the NDOs or responses. FIG. 2 explains the difference to known per-node request aggregation according to FIG. 1. Within FIG. 2 the NDO A needs to be transmitted through the network only once as compared to two times in the per-node request aggregation case see FIG. 1 and is duplicated at the node N3 for provision to the nodes N1 and N2 and further transmission to hosts H1, H2 and H3, see the right part of FIG. 2. From the middle part of FIG. 2 is obtainable that subsequent requests R2 and R3 are delayed at nodes N1 and N2 by the SDN controller. Only request R1, see the left part of FIG. 2, is transmitted to the source S for getting the content A. The invention is especially beneficial for streaming or live streaming of data to multiple receivers, as many requests for the same NDO arrive at the same time at different nodes of the network.

Within an embodiment of the invention the following assumptions can be made:
The software-defined ICN is operating in a 'provision request and response path at the same time' upon the initial handling of the request. When the response path is only provisioned when the NDO response is generated a similar but simpler approach is possible at the SDN controller.
The suggested embodiment includes a way to determine the best source for the requested content. This function can or cannot be cache-aware, i.e. know where content is cached.
For the rest of our description we use the term "content source" or "source" for both an ICN node actually providing the desired NDO from its storage as well as for an ICN node at the egress of the software-defined ICN network, which knows how to retrieve the content from another ICN.

Within the present document and description of the embodiment the term "node" can be used synonymously for the elements "node" or "switch" or "router". The term "node" can be used for all network elements which can route and/or transmit NDOs or data.

Figure 3:
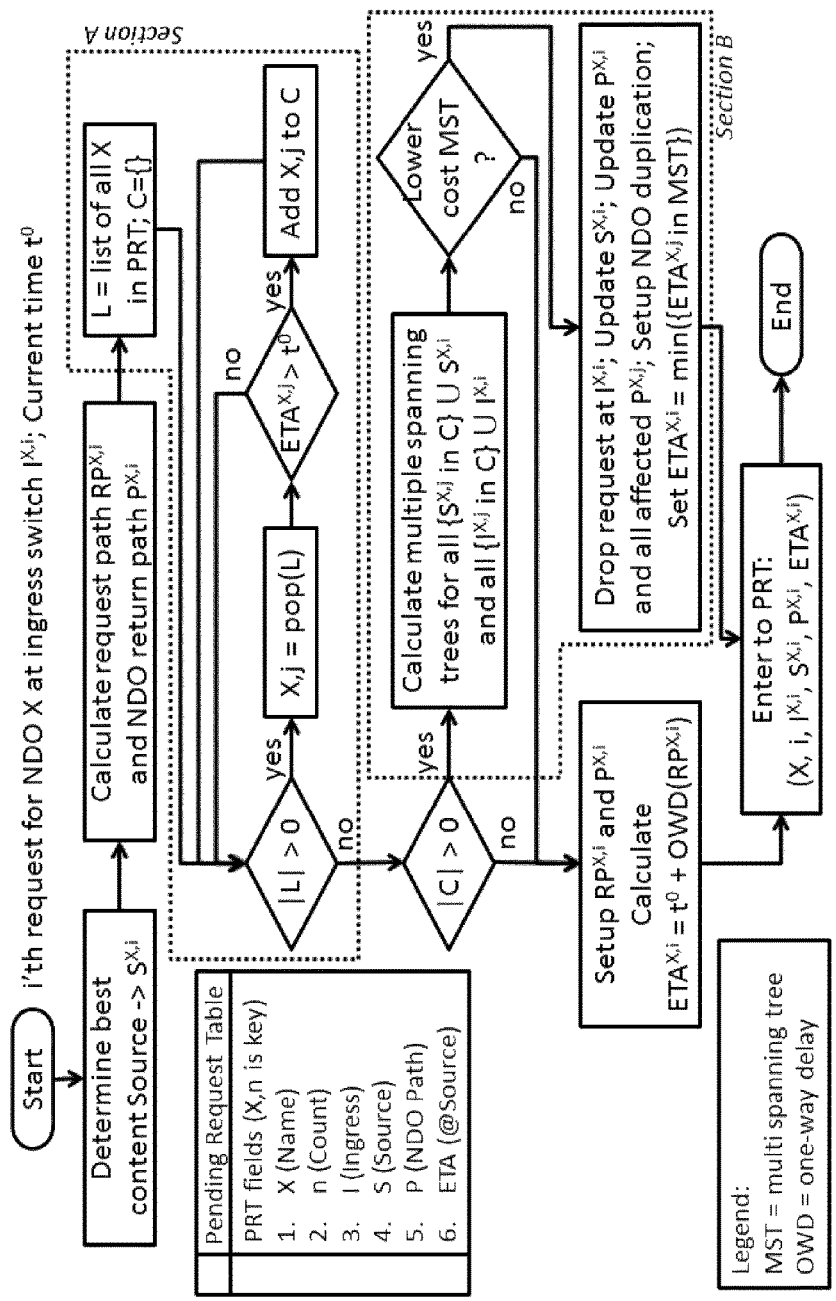
FIG. 3 depicts a flow chart of decisions for a network-wide request aggregation at a network controller according to an embodiment of the invention.

This embodiment of a software-defined SDN controller for network-wide request aggregation comprises:
1. A pending-request table PRT, often called pending interest table in ICN. Entries in the PRT need the following information, see also PRT fields in FIG. 3:
   a. The name of the requested NDO (X)
   b. A counter differentiating between requests for the same name (n)
   c. The identifier of the ingress SDN switch (I)
   d. The selected content source, e.g. cache, for the NDO (S)
   e. The selected return path for the NDO (P)
   f. The requests estimated time of arrival at the content source (ETA)
2. The topology of the SDN controlled ICN, along with a cost metric for all the possible paths/content sources. The topology needs to be annotated with expected per link one-way delay information. The cost metric serves as input to a multiple spanning tree calculation and can be related to one or a combination of the following information:
   a. Link delay
   b. Link bandwidth
   c. Link utilization
   d. ICN content source utilization
   e. Other traffic engineering metrics are applicable as well
3. A procedure to determine if and how to aggregate requests. FIG. 3 gives the high-level overview. The procedure starts in the top left corner ("Start") whenever the SDN controller detects a new request at the ingress of its network. We assume the request is for an NDO with the name X. Furthermore we assume this request is the i'th request seen by the SDN controller of this ICN and we set the current time to $t^0$. Finally we denote the ingress node by $I^{X,i}$.
   a. First the controller determines the best available content source $S^{X,i}$ for serving the requested NDO X.
   b. Next using and $S^{X,i}$ the controller calculates a path for the request $RP^{X,i}:I^{X,i} \to S^{X,i}$ and a path for returning the NDO $P^{X,i}:S^{X,i} \to I^{X,i}$ c. Then in Section A the controller determines all other pending requests j for the same NDO with name X, whose request has not yet reached the content source ($ETA^{X,j} > t^0$) and adds them to a list of candidate requests C for aggregation.

d. If this list of candidates is empty (not $|C| > 0$) the request is not aggregated and the controller configures $RP^{X,i}$ and $P^{X,i}$. This is e.g. the case when no other requests for the same NDO are present in the ICN. In addition the controller estimates the estimated time of arrival $ETA^{X,i}$ for that request at the content source. The next step is step f.

e. If however the list of candidates is not empty ($|C| > 0$), the controller enters in Section B and tries to see if there is a way to aggregate requests. For that purpose the controller calculates multiple spanning trees, MSTs, from the set of all possible sources ($\{S^{X,j}$ in $C\} \cup S^{X,i}$) to the set of all ingress nodes ($\{I^{X,j}$ in $C\} \cup I^{X,i}$). Then the controller evaluates the resulting MSTs regarding their cost.

i. If the lowest cost MST that includes the ingress node $I^{X,i}$ is equivalent to $P^{X,I}$ then there is no need for request aggregation and the controller continues with the actions described in step d.

ii. However if there is a better spanning tree with lower cost the controller instructs the ingress $I^{X,i}$ switch to drop the request and update $S^{X,i}$. It will also update $P^{X,i}$ and all other affected $P^{X,j}$ and it configures the new path in the network. The spanning tree defines the duplication points in the network, and the controller will configure copy rules in the switches accordingly. As a final step before continuing with step f the controller sets the ETA for the current request to the minimum of the ETA of the other requests in the selected MST ($\{ETA^{X,j}$ in MST$\}$).

f. Enter request in PRT and end.

Within the above description i and j are non-negative integers.

A simplified version of this control mechanism could be to configure the network in a way so that explicit feedback notifies the SDN controller when NDOs are sent out. That way there is no longer a need for delay annotations in the topology and the ETA estimation done in the two boxes before the "Enter to PRT" box in FIG. 3. In Section A the ETA checking would be swapped out for a simple check if the NDO response has already been sent out. This requires storing this binary information in the PRT, replacing the ETA information. However this simplified version requires communicating the sending of the NDO to the SDN controller and a processing of this trigger, updating the PRT. This will either cause overhead at the ICN object source node or the SDN controller or switch next to it.

In the embodiment described above we limit our optimizations to requests that have not yet reached their content source, because we need to be able to configure the return path. With tighter control over the information-centric network it is also possible to keep optimizing even if the NDO is already on its way to the requestor(s). However there is a trade-off between tight control and state-tracking overhead at the SDN controller and in the control network.

An even tighter control would be required for a system that exploits knowledge about on-path caching, and uses predictions to direct requests to nodes not yet holding the requested NDO. Once NDOs have been delivered to the requestor the entry in the PRT should be removed. However the PRT eviction strategy is not very relevant for this embodiment, as we preselect the candidate PRT entries based on the ETA of the request at the content source.

An embodiment of the invention can co-exist with cache optimization and other traffic engineering mechanisms. The cache optimization should be interfaced with the "Determine best content source" function in FIG. 3. Traffic engineering should probably use the same cost metric as the multiple spanning tree calculation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating an information-centric network (ICN) in which at least a first named data object (NDO) is addressable, the method comprising:
   implementing, in the ICN, software-defined networking (SDN) with an SDN controller; and
   performing, by the SDN controller, network-wide request aggregation in the ICN by:
      detecting an initial request for the first NDO received at a first ingress node of the ICN,
      detecting one or more additional requests for the first NDO received at one or more additional ingress nodes of the ICN, and
      aggregating the initial request for the first NDO received at the first ingress node and the one or more additional requests for the first NDO received at the one or more additional ingress nodes.

2. The method according to claim 1, wherein the SDN controller detects duplicate requests.

3. The method according to claim 1, wherein the SDN controller decides on which requests to delay.

4. The method according to claim 1, wherein the SDN controller decides how to route and/or where to duplicate the first NDO.

5. The method according to claim 1, wherein the ICN operates in a mode wherein a request path and a response path are provided at the same time upon an initial handling of the initial request.

6. The method according to claim 1, wherein the ICN operates in a mode wherein a response path is only provided when an NDO response is generated.

7. The method according to claim 1, wherein a best content source for the first NDO is determined.

8. The method according to claim 7, wherein the determination of the best content source for the first NDO is performed using knowledge of where content of the first NDO or the first NDO itself is cached.

9. The method according to claim 1, wherein the SDN controller comprises a Pending-Request Table (PRT).

10. The method according to claim 9, wherein the PRT comprises a name or identification of a requested NDO and/or a counter differentiating between requests for the name or identification and/or an identifier of an ingress SDN switch/node and/or a selected content source for the requested NDO and/or a selected return path for the requested NDO and/or the estimated time of arrival (ETA) of the requests at the content source.

11. The method according to claim 9, wherein an entry in the PRT is removed once the first NDO has been delivered to the requestor.

12. The method according to claim 1, wherein the SUN controller comprises the topology of the ICN.

13. The method according to claim 1, wherein the SDN controller comprises an expected per link one-way delay information.

14. The method according to claim 1, wherein the SDN controller comprises a cost metric for all possible paths and/or content sources.

15. The method according to claim 14, wherein the cost metric serves as input to a calculation of a cost of one or more spanning trees from a set of all possible sources.

16. The method according to claim 14, wherein the cost metric is related to a link delay and/or a link bandwidth and/or a link utilization and/or a content source utilization.

17. The method according to claim 1, wherein the SDN controller includes the definable rule.

18. The method according to claim 1, wherein the SDN controller determines the best available content source $S^{X,i}$ for serving a requested NDO X,
wherein i denotes the i'th request seen by the SDN controller, and
wherein the current time is set to $t^0$.

19. The method according to claim 18, wherein, using $I^{X,i}$, an ingress switch/node of the ICN, and $S^{X,i}$, the SDN controller calculates a path for the request $RP^{X,i}:I^{X,i} \to S^{X,i}$ and a path for returning the NDO $P^{X,i}:S^{X,i} \to I^{X,i}$.

20. The method according to claim 19, wherein the SDN controller determines all other pending j'th requests $X_j$ for the requested NDO X that have not yet reached the content source, and adds them to a list C of candidate requests for aggregation.

21. The method according to claim 20, wherein, if the list C of candidate requests is empty, the request will not be aggregated and the SDN controller configures $RP^{X,i}$ and $P^{X,i}$ and estimates an estimated time of arrival $ETA^{X,i}$ for that request at the content source.

22. The method according to claim 20, wherein, if the list C of candidate requests is not empty, the SDN controller checks whether aggregation of requests is possible.

23. The method according to claim 22, wherein the SDN controller calculates one or more multiple spanning trees (MST) from a set of all possible content sources ($\{S^{X,j}$ in $C\} \cup S^{X,i}$) to a set of all ingress switches/nodes ($\{I^{X,j}$ in $C\} \cup I^{X,i}$).

24. The method according to claim 23, wherein the SDN controller evaluates the resulting MSTs regarding a cost thereof.

25. The method according to claim 24, wherein, if the lowest cost MST that includes the ingress switch/node $I^{X,i}$ is equivalent to $P^{X,i}$, then no aggregation will be performed.

26. The method according to claim 24, wherein, if there is an MST with lower cost, the SDN controller instructs the ingress switch/node $I^{X,i}$ to drop the request and update $S^{X,i}$ and all other affected $P^{X,j}$ and configures a new path in the ICN.

27. The method according to claim 26, wherein the MST defines duplication points in the ICN.

28. The method according to claim 26, wherein the SDN controller configures copy rules in the switches/nodes within the ICN.

29. The method according to claim 27, wherein the SDN controller sets the ETA for the current request to the minimum of ETA of the other requests in the selected MST ($\{ETA^{X,j}$ in MST$\}$).

30. The method according to claim 1, wherein feedback notifies the SDN controller when the first NDO is sent from its content source.

31. An information-centric network (ICN) in which at least a first named data object (NDO) is addressable, the ICN comprising:
a plurality of ingress nodes; and
a software-defined networking (SDN) controller configured to perform network-wide request aggregation in the ICN by:
detecting an initial request for the first NDO received at a first ingress node of the ICN,
detecting one or more additional requests for the first NDO received at one or more additional ingress nodes of the ICN, and
aggregating the initial request for the first NDO received at the first ingress node and the one or more additional requests for the first NDO received at the one or more additional ingress nodes,
wherein SDN controller is implemented in the ICN with the SDN controller.

* * * * *